United States Patent [19]
Hawkshaw

[11] Patent Number: 4,474,350
[45] Date of Patent: Oct. 2, 1984

[54] PROBE FOR WATER BOMBER

[75] Inventor: John K. Hawkshaw, Brampton, Canada

[73] Assignee: Field Aviation Company Ltd., Toronto, Canada

[21] Appl. No.: 446,431

[22] Filed: Dec. 2, 1982

[51] Int. Cl.³ .................. B64D 1/22; A62C 28/00
[52] U.S. Cl. ................................ 244/136; 169/53; 244/94; 441/71; 440/47
[58] Field of Search .............. 244/136, 94, 95, 53 B; 239/171, 267; 441/71; 440/88, 47; 138/44, 39; 285/176; 169/53

[56] References Cited

U.S. PATENT DOCUMENTS

| | | | |
|---|---|---|---|
| 2,117,234 | 5/1938 | Austin et al. | 244/94 |
| 2,990,142 | 6/1961 | Ferri | 244/53 B |
| 3,000,401 | 9/1961 | Ringleb | 138/39 |
| 3,423,053 | 1/1969 | Hawkshaw | 244/136 |
| 3,447,324 | 6/1969 | French | 440/47 |
| 3,752,110 | 8/1973 | Rhoda | 440/47 |
| 4,098,073 | 7/1978 | Adkins et al. | 138/39 |

FOREIGN PATENT DOCUMENTS

| | | | |
|---|---|---|---|
| 41400 | 3/1977 | Japan | 244/136 |
| 21750 | of 1908 | United Kingdom | 138/44 |

OTHER PUBLICATIONS

Aviation Week & Space Technology, Oct. 30, 1967, pp. 88-89.

Primary Examiner—Galen L. Barefoot
Attorney, Agent, or Firm—Fetherstonhaugh & Co.

[57] ABSTRACT

A loading mechanism for loading water into a water storage tank of a water bomber aircraft is improved by separating the probe from the receiver conduit and by forming the probe with a cross-sectional area which is substantially less than the cross-sectional area of the receiver conduit. As a result of these improvements, the jet of water is discharged freely from the probe into the receiver conduit, thereby preventing the drag forces which are applied to the water passing through the receiver conduit being transmitted to the probe. A further improvement is in that the probe is positioned so that the input end is only partially exposed below the step with the result that an airspace is formed in the stream of water passing through the probe in use.

16 Claims, 5 Drawing Figures

PROBE FOR WATER BOMBER

FIELD OF INVENTION

This invention relates to water bomber aircraft. In particular, this invention relates to an improved loading mechanism for loading water into a water storage tank of a water bomber aircraft.

PRIOR ART

Water bomber airplanes are used for the purposes of bombing fires such as forest fires and the like. Generally, water bombing aircraft are designed to permit their water storage tanks to be refilled at flying speed during a landing touchdown on a body of water. Power is applied on touchdown so that the speed of the aircraft is maintained at or near (preferably above) take-off speed. At these speeds, the hull or float is "on the step", that is to say only the forebody of the hull is touching the water, the afterbody of the hull being above the level of the surface of the water coming off the forebody. The distance of the afterbody above the surface is equal to the height of the step. A scooping nozzle or probe in the form of an elbow is mounted on the hull or on the floats of a float plane, behind the step. When not in use, the scooping nozzle is retracted so that it's input end is disposed above the level of the water coming off of the forebody. The scooping nozzle is connected to the water storage tank by means of a system of internal pipes which lead directly from the discharge end of the scooping nozzle to the water storage tank.

To load the water storage tank, the input end of the probe is lowered into the flow of water coming off of the forebody where the speed of the water is sufficient to force the flow through the probe and around the elbow of the probe and upwardly through the conduit system into the water storage tank.

Water bomber airplanes use as their source of water, the body of water which is nearest to the bombing site which is large enough to permit a loading run. The rate at which a water bomber can deliver a payload to the drop site is determined by the proximity of the water body to the drop site. Generally, smaller bodies of water are very much more numerous than larger bodies of water with the result that the water bombing productivity increases dramatically as the length of the loading run decreases. The emphasis is therefore placed on the design of the scooping system in order to make the loading run as short as possible.

To maintain efficiency, it is important that during the loading run the aircraft must maintain flying speed. If speed of the aircraft drops below the flying speed, the loading time will be greatly increased by the need to regain speed after loading to permit take-off. This makes the total distance required for loading to equal the sum of the loading distance plus the distance required in order to regain take-off speed.

It will be apparent that the speed of loading can be varied by changing the cross-sectional area of the probe. By increasing the cross-sectional area of the probe, the water drag is increased and consequently, more power is required in order to maintain flying speed. Conversely, if the probe having a smaller cross-sectional area is used, the power requirements are reduced however the loading time is increased.

If the cross-sectional area of the probe is so large that the airplane does not have sufficient power to drag it through the water, the airplane speed will drop off to below flying speed. If on the other hand, the cross-sectional area of the probe is so small that it requires less than full power of the aircraft to drag it through the water, then it is not using the full potential of the aircraft.

The optimum probe size is therefore that which the plane, at full power, can just drag through the water at a speed which is the minimum flying speed of the airplane.

The shape of the water immersed portion of the probe will also affect the loading performance as will the shape and proportions of the internal conduits used for conveying the water from the probe to the water storage tanks to the aircraft. A poorly designed probe will apply excessive drag forces and poorly designed conduits will slow the flow of water to the water storage tank and, therefore, lengthen the time required to load the water tank.

A well designed probe and conduit system is one which takes in the most water and has the least drag for its size.

It is therefore desirable to design the probe so that the portion which is immersed in the water is sized according to the available power of the airplane. The optimum probe system also preferably has the highest ratio of water intake rate, to drag, in the probe input end and in the conduit system leading to the water storage tank.

While the efficiency of operation of the water bomber is an important result of the optimal water loading mechanism, it is not the only advantage to be derived from an efficient loading system. The heaviest and most critical workload for the pilot and the heaviest wear and tear on the airplane is that experienced during the loading run. The shorter loading runs associated with an optimized probe system will, therefore, have significant side-effect benefits by reducing pilot fatigue and reducing aircraft maintenance costs.

The drag which is applied to the probe as it is drawn through the water comes from two main sources. Firstly, the drag results from the energy expended to accelerate the water to aircraft speed and to lift the water to the input to the water storage tank. The second source of drag is all of the drag over and above that of the first source which includes drag resulting from the various turbulences, skin frictions, mechanical drag and it is these various drag sources which can be reduced in order to increase the efficiency of operation of the loading system.

While existing probe systems may appear to be proportioned to provide theoretical proportions required for an efficent operation, in practice the existing systems do not perform well in water intake rate and in drag.

The exposed portion of the probe of existing probe systems is not shaped and constructed to achieve low drag and the internal conduit system which connects the probe to the water storage tank follows a tortuous path which requires the water to travel around numerous bends, corners and cascades which impose serious drag forces on the flow. Furthermore, the water has to flow over the entire internal surface of the probe and the conduit system and this again contributes to the drag forces applied to the water. In flying boats, the area of the surface of the probe on the various conduits leading to the water storage tank is about ten square feet. Skin friction over this area is quite significant and further reduces the flow rate. As a result of the internal drag in the known systems, the velocity of flow through the probe intakes is only about 65% to 75% of aircraft water speed. That is to say, only about 65% to 75% of the water that the probe opening sees ahead of it, is actually taken in. The other 25% to 35% overspills around the outside of the probe mouth with the result that the airplane is required to pull not only 100% of the actual probe but also a bluff area of 25% to 35% more. It is for these reasons that the existing probes only appear to be sized to the correct proportions required for specific aircraft. These internal and external drag effects are compounded with the result that only 65% to 75% of the available water enters the probe, there is also an effective increase in probe size resulting from the bluff area which has the effect of increasing the probe size to 125% to 135% of the actual probe size. In addition, the difference between the internal area of the input end of the probe and external area of the input end of the probe adds a further 10% to the area of the probe which must be dragged through the water. Finally, when for example, the intake efficiency is 70%, the external drag is 130%, the mechanical drag is 10%, the probe system performance factor will equal:

$$\frac{70}{130 + 10} \times 100 = 50\%$$

I have found that the existing probe systems are not as efficient as they have previously been thought to be and I am now able to increase the efficiency of the water loading to an extent sufficient to substantially increase efficiency of operation of a water bomber in use.

I have found I can significantly reduce the drag effect of the conduits which convey the water from the probe to the water storage tank by the simple experiment of constructing the probe so that it discharges water in a jet stream into the conduit system leading to the water storage tank in a "rooster tail" type jet.

In addition, I have found that I can significantly reduce the drag effect of the probe by providing that the probe has a novel cross-sectional configuration. I can also reduce the drag effect of the probe by insuring that an airspace is provided above the level of the water passing through the probe. In addition, I can improve the efficiency of operation of the probe in the specific aircraft by providing that the probe is adjustably mounted so that the extent to which it projects beyond the step of the aircraft is adjustable. It will be understood that this adjustment is made during the initial fitting to each different type of aircraft. The same setting applies to all aircraft of the same type with the result that it is not subsequently necessary to make these adjustments.

SUMMARY OF INVENTION

According to one aspect of the present invention, there is provided in the water bomber airplane of the type having, a water contacting member in the form of a hull or float formed with a step between the forebody and the afterbody thereof, a water storage tank and water loading means communicating with the water storage tank to permit the water storage tank to be loaded with water when the aircraft is travelling in an "on the step" touchdown mode across the surface of a body of water at flying speed; the improvement wherein said water loading means comprises a two-piece conduit comprising, a probe having a first through passage which has in input end and an output end, the first through passage curving rearwardly and upwardly from the input end thereof and having a first cross-sectional area, a receiver conduit having a first through passage which has an input end and an output end, the output end of the receiver conduit communicating with said water storage tank, said second through passage having a second cross-sectional area, mounting means for mounting said probe rearwardly of said step for movement between a lowered position in which the input end thereof projects below the step to receive water, and a raised position in which the input end is obscured behind said step, said output end of said probe being disposed, when said probe is in said lowered position, to discharge a jet of water into the input end of said second section, said second cross-sectional area of said second through passage being substantially larger than that of said first section such that the jet of water is discharged freely into the second through passage until it is spaced a substantial distance from the discharge end of said probe, thereby to prevent the drag forces which are applied to the water passing through the receiver conduit being transmitted to the probe.

According to a further aspect of the present invention, there is provided a loading mechanism for loading water into a water storage tank of a water bomber aircraft of the type having a water contacting member in the form of a hull or float formed with a step between the forebody and afterbody thereof, and which loads water when it is travelling in an "on the step" touchdown mode across the surface of a body of water at flying speed comprising, a probe having a first through passage which has an input end and an output end, the first though passage having a first cross-sectional area, a receiver conduit having a second through passage which is an input end and an output end, said second through passage having a second cross-sectional area, said receiver conduit being adapted to be mounted on said aircraft with the output end thereof communicating with the water storage tank and the input end thereof opening downwardly, mounting means for mounting the probe rearwardly of said step for movement between a lowered position in which at least a portion of the input end thereof projects below the step to receive water and a raised position in which the input end is obscured behind the step, said mounting means being adapted to support said probe with the output end thereof arranged to discharge a jet of water into the input end of the receiver conduit, said through passage of said receiver conduit having a cross-sectional area which is substantially larger than that of said first through passage such that the jet of water discharges freely into the second through passage until it is spaced a substantial distance from the discharge end of the probe.

According to yet another aspect of the present invention, there is provided a method of loading the water storage compartment of a water bomber of an airplane of the type having a water contacting member in the form of a hull or float formed with a step between the forebody and afterbody thereof, and water loading means communicating with the tank to permit the water storage tank to be loaded with water when the aircraft is travelling in an "on the step" touchdown mode across the surface of a body of water at flying speed comprising the steps of redirecting a stream of water passing below the step into an upwardly directed path and discharging the upwardly directed stream of water in the form of a freely expanding water jet and, thereafter confining the upwardly directed water jet at a substantial distance above its point of discharge and directing the thus confined jet into the water storage tank.

According to yet another embodiment of the present invention, there is provided in a loading mechanism for loading water into a storage tank of a water bomber, which compresses a probe and conduit means connecting the probe to a water storage tank, the probe having an input end for receiving water passing under the step of an airplane and a through passage which extends rearwardly and upwardly from the input end in a curved path, improvement wherein the probe is positioned such that a portion of the input end of the probe which is located at the radially inner side of the curved path, is obscured from the water passing under the step whereby an air space is formed along the radially inner portion of the path in use thereby to minimize turbulence in the flow of water passing through the probe.

PREFERRED EMBODIMENT

The invention will be more clearly understood after reference to the following detailed specification read in conjunction with the drawings wherein.

Figures 1, 5:
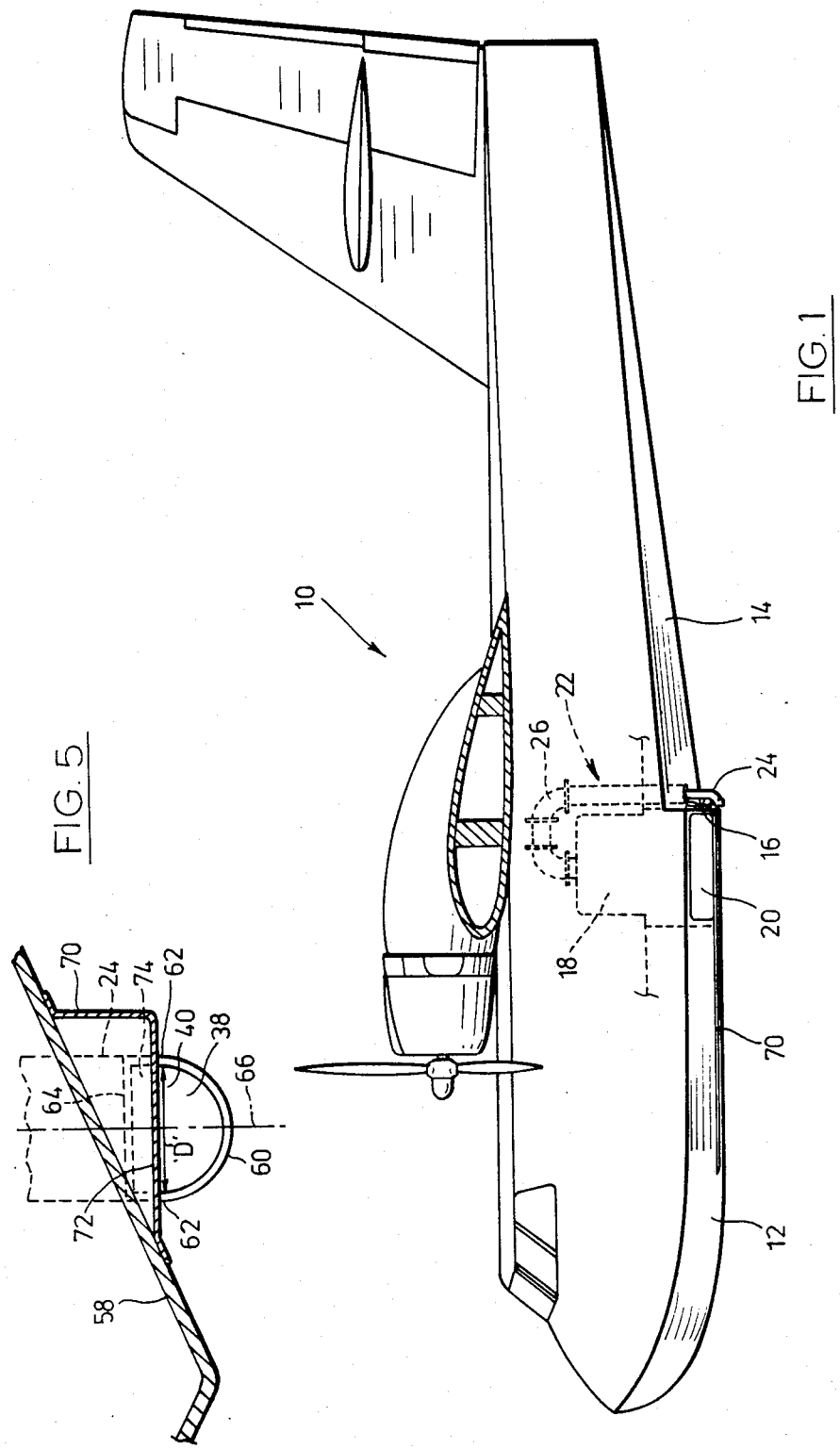
FIG. 1 is a side-view of one type of water bomber aircraft incorporating a water tank loading system constructed in accordance with the embodiments of the present invention.
FIG. 5 is a front view of the probe in the lowered position.
Figure 2:
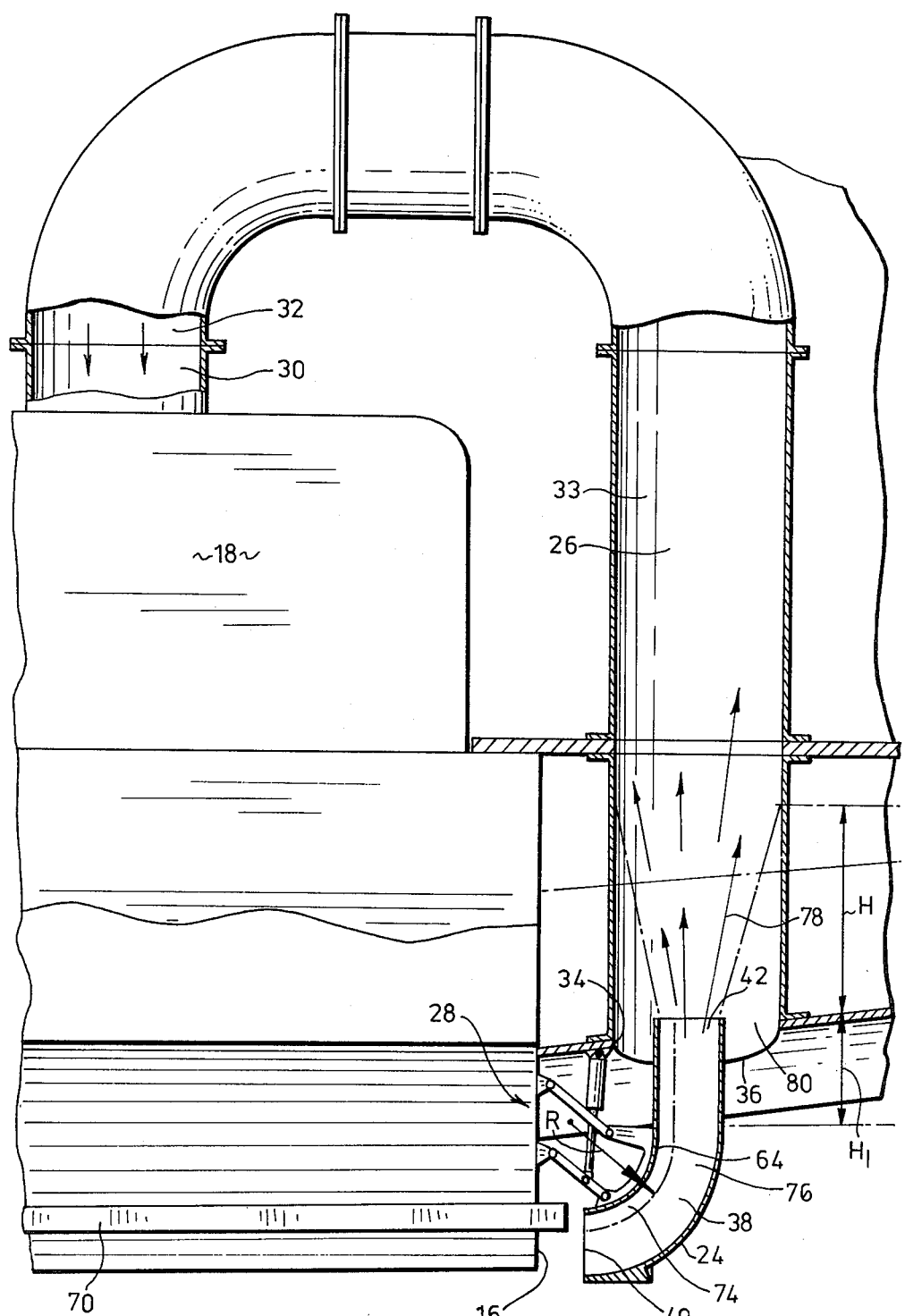
FIG. 2 is a partially sectioned side-view of a loading mechanism for loading water into the water storage tank of the water bomber according to one aspect of the present invention showing the probe in a lowered position.

In FIG. 1 of the drawings, the reference numeral 10 refers generally to a flying boat type of water bomber aircraft. However, it will be understood that the present invention is equally applicable to "float plane-type" water bombers. The airplane 10 has a forebody 12 and an afterbody 14 separated from one another by step 16. A water storage tank 18 is mounted in the forebody of the aircraft and bomb doors 20 open from the forebody of the aircraft through which water may be discharged from the water storage tank 18. The loading mechanism for loading water into the water storage tank of the water bomber is generally identified by the reference numeral 22 and comprises a probe or probe 24 and a compound receiver conduit 26. The probe 24 is mounted for movement relative to the step 16 by means of a mounting mechanism generally identified by the reference numeral 28 (FIG. 2).

The water storage tank 18 has an input passage 30 which communicates with the discharge end 32 of the through passage 33 of the conduit 26. The input end 34 of conduit 26 opens through a passage 36 formed in the afterbody.

The probe 24 is in the form of a conduit which has a through passage 38 which extends from an input end 40 to a discharge end 42. The through passage 38 extends through an arc of 90 degrees from the input end 40. A clean breakaway collar 41 is formed on the outer face of the input end 40 and extends rearwardly from the input end 40. The collar 41 has an inclined face 43 extending forwardly from its back edge to the outer periphery of the probe.

The cross-sectional area of the through passage 38 of the probe 24 is substantially less than the cross-sectional area of the through passage 33 of the receiver conduit 26. Similarly, the cross-sectional area of the external periphery of the probe 24 is substantially less than the cross-sectional area of the input end of the through passage 33.

Figure 3:
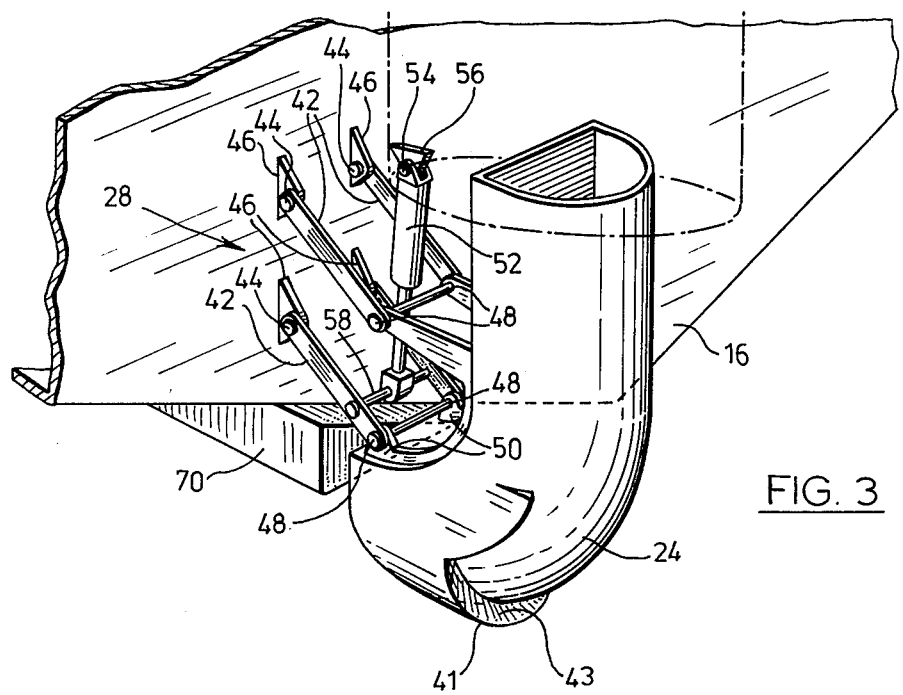
FIG. 3 is a pictorial back-view of the probe portion of the loading mechanism of FIG. 2.
Figure 4:
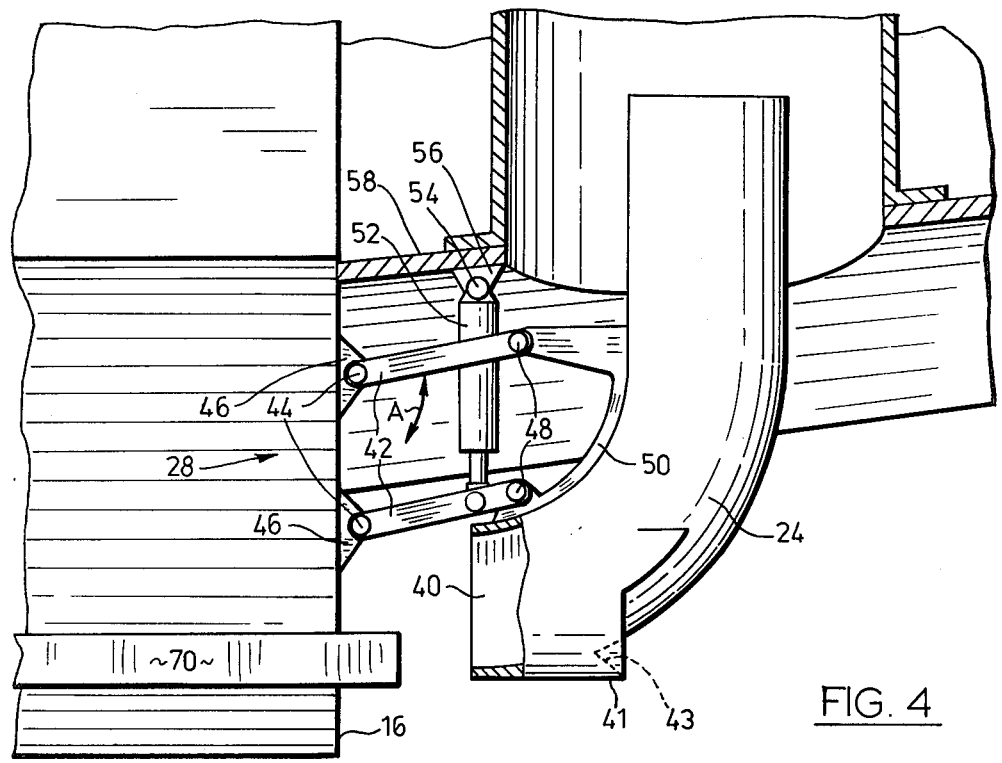
FIG. 4 is an enlarged side-view of the probe of FIG. 2 in the raised position.

The mounting mechanism 28 is best illustrated in FIGS. 3 and 4 of the drawings to which reference is now made. The mounting mechanism is mounted on the end face 40 of the step 16. The mounting mechanism 28 comprises four link arms 42 which are arranged in parallel. One end of each link arm 42 is pivoted at points 44 on bracket 46 which are mounted on the end face 40 of the step 16. The other ends of the link members 42 are pivotally mounted at pivot points 48 on bracket 50 which are secured to the probe 24. An extensibly hydraulically activated ram 52 has one end pivotally mounted on a pivot pin 54 carried by a bracket 56 which is secured to the frame 58 of the aircraft. The other end of the ram is pivotally connected to a shaft 58 which extends between the lower link arms 42. The ram 52 is operable to move the link arms 42 to and frow in the direction of the arrows A to move the probe 42 between raised position shown in FIG. 4 of the drawings and the lowered position shown in FIGS. 2 and 3 of the drawings.

The probe 24 is formed such that the profile of the cross-section of the through passage 38 is as illustrated in FIG. 5 of the drawings. The cross-section of the through passage 38 includes a semi-circular wall portion 60 having an internal diameter D, a pair of straight sidewall portions 62 and a horizontally oriented transverse sidewall 64. The cross-sectional of the through passage 38 is symetrical about the axis 66 which is preferably arranged to be vertically oriented when the aircraft is in the "on the step" touch-down mode. In order to insure that the stream of water directed into the input end 40 of the probe 38 has a configuration compatible with that of the input end 38, a ramp 70 is mounted on the forebody and extends forewardly from the step 16. The ramp 70 is shaped to gradually emerge from the water contacting portion of the forebody of the aircraft until it assumes the configuration shown in FIG. 5 wherein the lower face 72 extends across the full width of the input end 40 of the probe 24 at right angles to the axis 60. The probe 24 is preferably positioned such that the semi-circular lower portions of the input end is exposed below the ramp 70.

By adjusting the length of the ram 52, it is possible to change the position of the input end 40 of the probe 24 relative to the ramp when the probe is in the lowered position, thereby to change the area of the input end 40 which is exposed below the lower wall 72 of the ramp 70. The facility with which this adjustment can be achieved, i.e. by merely adjusting the length of the ram 52, permits the intake proportions of the probe to be adjusted to match the performance of the aircraft to which it is fitted.

Furthermore, by positioning the probe 24 so that when it is in the lowered position shown in FIGS. 2 and 5, wherein the wall 64 of the probe is spaced above the wall 72 of the ramp, an airspace 74 is formed between the wall 64 and the incoming stream 76 of water. Because the portion of the input passage which is obscured by the ramp is radially inwardly of the arcuate path of travel, by providing this airspace adjacent the wall 64 which is located at the inner periphery of the arc of curvature of the through passage 38, the turbulence created in the water stream 76 is minimized.

In order to load the water storage tank 18, the probe 24 is positioned as shown in FIGS. 1, 2, 3 and 5 of the drawings. The aircraft, travelling at flying speed, makes an "on the step" touch-down on the surface of a body of water such as a sea, lake or river. A stream of water passing under the ramp 70 is directed into the exposed portion of the input end of the through passage 38 of the probe 24. The stream of water is redirected upwardly through the through passage 38 and is discharged through the output end 42 in the form of a jet 78 of water which will travel upwardly without restriction over a height H, which is preferably at least 3D, until it contacts the sidewalls of the receiver conduit 33 following which it will be carried under its own momentum through the passage 33 to discharge into the input passage 30 of the tank 18 thereby to fill the storage tank 18. It will be noted that an annular space 80 is provided between the discharge end of the probe 24 and the input end of the receiver conduit 26, such that the discharge end of the probe is substantially uniformly space from the surrounding wall of the input end of the receiver conduit.

Preferably, the cross-sectional area of the input end 34 of the receiver conduit 26 is at least twice that of the cross-sectional area of the discharge end 38 of the probe 24.

I have found that by forming the water loading means from two separate conduits, such that a jet of water is discharged from one conduit into the other conduit, I am able to significantly reduce the drag effect of the water loading conduit system. By terminating the probe at a height just above the 90 degree bend, I am able to obtain an upwardly directed jet of water while leaving the water to fly freely upwards as in a "roostertail" of the type generated behind a speed boat. This "roostertail" is subsequently deflected around the bends of the receiver conduit and it will be noted that only two such bends are formed with the result that the water is permitted to flow substantially directly into the input of the water storage tank with a minimum of disruption.

By separating the probe from the remainder of the conduits leading to the water storage tank, the efficiency of the total system is substantially the efficiency of the probe. Given that the mechanical drag on the probe tip is minimized, it can be reduced to about 4%. Another factor to be considered is the skin friction on the wetted area of the probe. This friction results in two losses which are compoundable. One loss is the reduction of the flow rate due to friction and the other is the drag caused by the overspill at the probe mouth. The probe size is a fixed size depending upon the power available in the particular aircraft type, and it follows that skin friction is the only major factor which can be minimized and this is achieved in the present probe by minimizing the wetted area of the probe elbow. While there is a further loss due to sheer in the water stream when it is redirected around the elbow these losses are extremely small relative to the skin friction. Furthermore sheer losses can be minimized by maximizing the radius R of the probe bend and by minimizing the height to width ratio as described below.

While a circle has the greatest area for its perimeter and a circular pipe is therfore the most efficient fluid conveyor, this is only true if the pipe is full of fluid. That is, I have indicated that a circular pipe, of twice the area but only half full, has only 71% of the wetted area, although the fluid flow is the same. My probe, is therefore proportioned to take advantage of this characteristic in that it is shaped so that a semi-circular cross-section projects below the wall 72 of the ramp. Consequently, skin friction is then over the area of the radially outer internal surface of this pipe, the water finding its own level on its upper surface as it flows rearwardly and upwardly through the elbow. The wetted area is only about one square foot in a probe or typical probe. By providing a space above the water, the water is not in contact with the inside corner of the conduit at the elbow with the result that no choking or turbulence occurs as can easily occur in a full pipe. A further side effect, and a very useful one is that this probe may be finely trimmed so that it is sized perfectly to match the aircraft power available. It is very difficult in any probe design to select the precise cross-sectional area. The present probe, however, can be adjusted slightly above or below the half emersion point with only slight efficiency changes and can be sized perfectly to match the aircraft power. In view of the fact that only the lower or outer half of the elbow is in contact with the water, the inside half now need not be circular, but rather any shape, greatly easing the mechanical design of its mounting and operation.

Measurements taken in experimental trials have shown that a probe of the type described above is capable of an intake of 94% of the water the probe sees ahead of it. This indicates that the overspill is only of the order of about 6%. Consequently, my probe size is now 106% of the theoretical ideal probe size. If an additional 4% is added as the mechanical area of the thickness of the wall of the probe, the total probe area is 110% of theoretical there required area. Thus, the probe system performance factor wil equal:

$$\frac{94}{106 + 4} \times 100 = 85\%$$

In a typical airplane having a water load of 12,000 lbs., the diameter 'D'=5.5 inches, the radius R=5.5 inches and the height H1=8 inches. The receiver pipe may have a diameter of 9 inches.

From the foregoing, it would be apparent that the water loading mechanism of the present invention provides a substantial increase in efficiency over that of prior systems. This is achieved by eliminating the transfer of the drag effect associated with the internal water conduit system to the probe and by reducing the wetted area of the probe. Further improvements are achieved by changing the shape of the input end of the probe and by reducing the skin friction and turbulence on the inside corner of the probe elbow. Further advantages are derived from the fact that the probe area can be proportioned to match aircraft power capabilities. In addition, because the inner wall of the probe does not make contact with the water, it can be formed to any required shape to facilitate mounting of the probe.

Furthermore, the adjustment of the setting of the probe may be achieved by mounting the ends of the shaft 58 in slots formed in the link arms 42 so that the extent of movement of the arms 42 can be adjusted.

These and other advantages of the apparatus and method described herein will be apparent to those skilled in the art.

The embodiments of the invention in which an exclusive property or privilege is claimed are defined as follows:

1. In a water bomber airplane of the type having:
a water contacting member in the form of a hull or float formed with a step between the forebody and the afterbody thereof, a water storage tank and water loading means communicating with the water storage tank to permit the water storage tank to be loaded with water when the aircraft is travelling in an "on the step" touchdown mode across the surface of a body of water; the improvement wherein said water loading means comprises a two-piece conduit comprising;
   (a) a probe having a first through passage which has an input end and an output end, the first through passage curving rearwardly and upwardly from the input end thereof and having a substantially uniform first cross-sectional area and configuration along its full length thereby to minimize flow impedance through said first through passage,
   (b) a receiver conduit having a first through passage which has an input end and an output end, the output end of the receiver conduit communicating with said water storage tank, said second through passage having a second cross-sectional area,
   (c) mounting means for mounting said probe rearwardly of said step for movement between a lowered position in which the input end thereof projects below the step to receive water and a raised position in which the input end is obscured behind said step,
   (d) said output end of said probe being disposed, when said probe is in said lowered position, to discharge a jet of water into the input end of said second section, said second cross-sectional area of said second through passage being substantially larger than that of said first probe such that the jet of water is discharged freely into the second through passage until it is spaced a substantial distance from the discharge end of said probe, thereby to prevent the drag forces which are applied to the water passing through the receiver conduit being transmitted to the probe.

2. A water bomber airplane as claimed in claim 1 wherein the cross-sectional area of said second through passage is about at least twice that of the cross-sectional area of said first through passage.

3. A water bomber as claimed in claim 1 wherein an annular gap is formed between the discharge end of the probe and the input end of the receiver conduit such that the discharge end of the probe is substantially uniformly spaced from the surrounding wall of the receiver conduit.

4. A water bomber as claimed in claim 1 wherein an upper portion of the input end of the probe is disposed above said step whereby an air space is formed along the full length of the probe above the stream of water passing through the probe in use.

5. A water bomber as claimed in claim 1 wherein said mounting means is adjustable to adjust the proportions of the portion of the input end of the probe which projects below the step, thereby to size adjust the cross-sectional area of the input to match the aircraft power available.

6. A water bomber as claimed in claim 1 wherein the input end of the probe is transversely symetrical about a vertical axis and a ramp is provided on said forebody upstream of the input end of the probe, said ramp having a horizontally extending planner undersurface being arranged to form the stream of water passing over the step so that it is symetrical about the vertical axis of the input end at the point of entry into the input end of the probe.

7. A water bomber as claimed in claim 6 wherein the input end of the probe has a lower edge which extends in a semi-circular arc about said vertical axis.

8. A loading mechanism for loading water into a water storage tank of a water bomber aircraft of the type having a water contacting member in the form of a hull or float formed with a step between the forebody and afterbody thereof, and which loads water when it is travelling in an "on the step" touchdown mode across the surface of a body of water comprising:
   (a) a probe having a first through passage which has an input end and an output end, the first though passage having a substantially uniform first cross-sectional area and configuration along its full length thereby to minimize flow impedance through said first through passage,,
   (b) a receiver conduit having a second through passage which is an input end and an output end, said second through passage having a second cross-sectional area, said receiver conduit being adapted to be mounted on said aircraft with the output end thereof communicating with the water storage tank and the input end thereof opening downwardly, mounting means for mounting the probe rearwardly of said step for movement between a lowered position in which at least a portion of the input end thereof projects below the step to receive water and a raised position in which the input end is obscured behind the step,
   (c) said mounting means being adapted to support said probe with the output end thereof arranged to discharge a jet of water into the input end of the receiver conduit, said through passage of said receiver conduit having a cross-sectional area which is substantially larger than that of said first through passage such that the jet of water discharges freely into the second through passage until it is spaced a substantial distance from the discharge end of the probe.

9. A loading mechanism as claimed in claim 8 wherein the cross-sectional area of said second through passage is about at least twice that of the cross-sectional area of said first through passage.

10. A loading mechanism as claimed in claim 8 wherein an annular gap is formed between the discharge end of the probe and the input end of the receiver conduit such that the discharge end of the probe is substantially uniformly spaced from the surrounding wall of the receiver conduit.

11. A loading mechanism as claimed in claim 8 wherein an upper portion of the input end of the probe is disposed above said step whereby an air space is formed along the full length of the probe above the stream of water passing through the probe in use.

12. A loading mechanism as claimed in claim 8 wherein said mounting means is adjustable to adjust the proportions of the portion of the input end of the probe which projects below the step, thereby to size adjust the cross-sectional area of the input to match the aircraft power available.

13. A loading mechanism as claimed in claim 8 wherein the input end of the probe is transversely symetrical about a vertical axis and a ramp is provided on said forebody upstream of the input end of the probe, said ramp having a horizontally extending planner undersurface being arranged to form the stream of water passing over the step so that it is symetrical about the vertical axis of the input end at the point of entry into the input end of the probe.

14. A loading mechanism as claimed in claim 13 wherein the input end of the probe has a lower edge which extends in a semi-circular arc about said vertical axis.

15. A loading mechanism for loading water into a storage tank of a water bomber, which comprises a probe and conduit means connecting the probe to a water storage tank, the probe having an input end for receiving water passing under the step of an airplane and a through passage which extends rearwardly and upwardly from the input end in a curved path, improvement wherein the through passage of the probe has a cross-sectional area which does not decrease along its length from the input end and wherein the probe is positioned such that a portion of the input end of the probe which is located at the radially inner side of the curved path, is obscured from the water passing under the step whereby probe cooperates with the step to provide an air space which extends continuously along the radially inner portion of the path in use thereby to minimize turbulence in the flow of water passing through the probe.

16. A method of loading the water storage compartment of a water bomber of an airplane of the type having a water contacting member in the form of a hull or float formed with a step between the forebody and afterbody thereof, and water loading means communicating with the tank to permit the water storage tank to be loaded with water when the aircraft is travelling in an "on the step" touchdown mode across the surface of a body of water at flying speed comprising the steps of directing a stream of water passing below the step into a first conduit which is shaped to redirect the stream into an upwardly directed path and discharging the upwardly directed stream of water from the first conduit into a second larger conduit in the form of a freely expanding water jet and, thereafter confining the upwardly directed water jet in said second conduit at a substantial distance above its point of discharge and directing the thus confined jet into the water storage tank.

* * * * *